United States Patent Office 3,450,841

Patented June 17, 1969

3,450,841

CARRIER FREQUENCY STABILIZATION FOR CARRIER FREQUENCY SYSTEMS WITH SUPPRESSED CARRIER WAVES

Walter Zeiser, Stuttgart, Hans Loffler, Ludwigsburg, and Otmar Kolb, Stuttgart-Weilimdorf, Germany, assignors to International Standard Electric Corporation, New York, N.Y., a corporation of Delaware Filed Aug. 2, 1965, Ser. No. 476,430
Int. Cl. H04j *1/04*
U.S. Cl. 179—15 1 Claim

ABSTRACT OF THE DISCLOSURE

Carrier frequency systems utilizing carrier suppression. Pilot signals are transmitted from west-to-east and from east-to-west. The pilots are individually used at the repeaters and at certain terminal stations to reconstruct the carrier signal for use in stabilizing the systems, such as with frequency frogging.

Figures 1A, 1B, 1C, 1D:
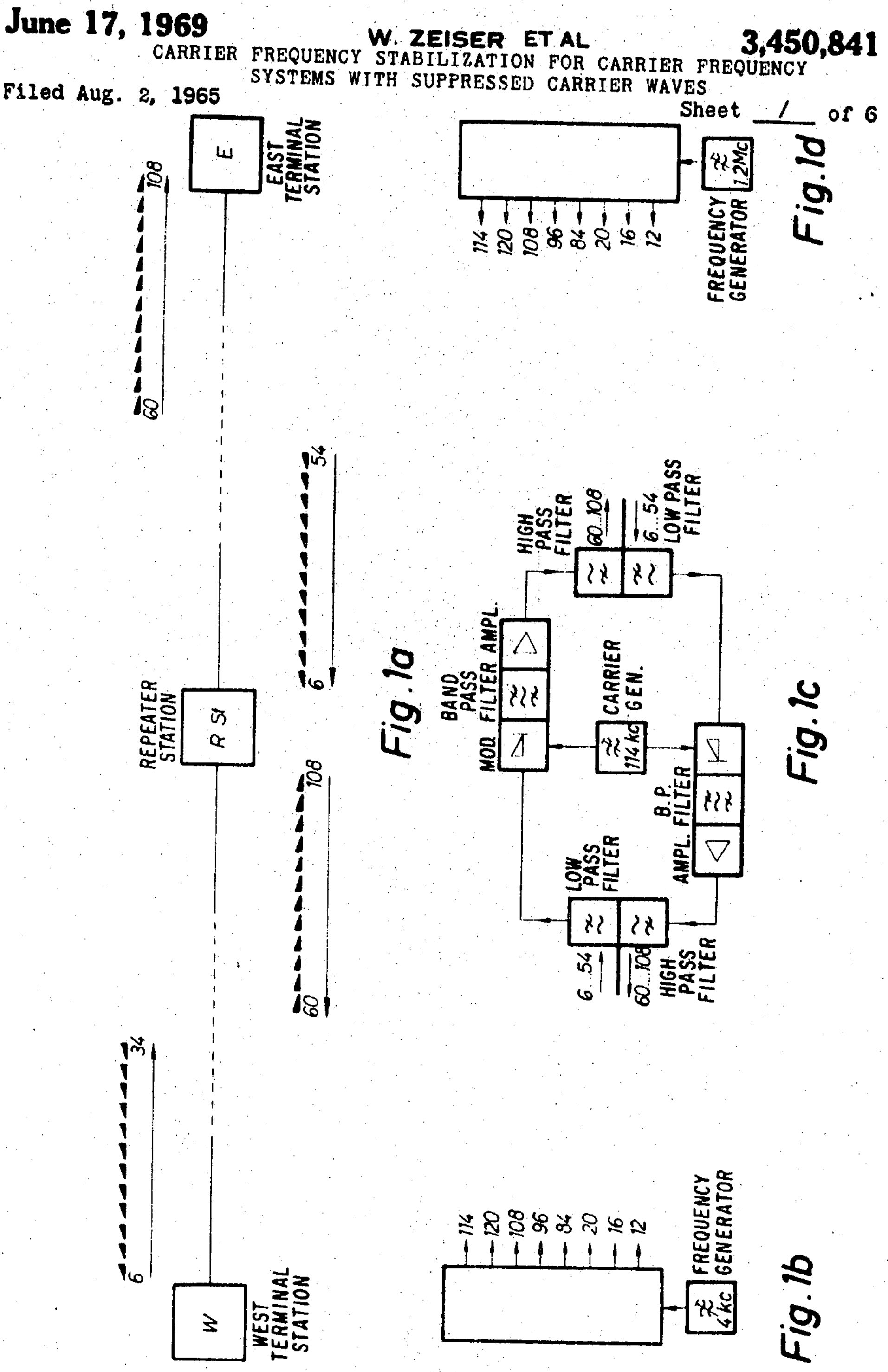

The invention relates to automatic carrier frequency stabilization in carrier frequency systems with suppressed carrier waves.

In the carrier frequency engineering systems with carrier suppression, engineering systems with carrier suppression, single-sideband systems are generally used. Since the intelligence contents are transmitted thereby without carrier in the form of the sidebands, usually one sideband, it is necessary to add the suppressed carrier again for the demodulation. These carriers added for demodulation should coincide in frequency within very narrow-tolerances with the carriers used for modulation at the transmitting stage otherwise a frequency shift of the intelligence is caused which in turn may cause considerable distortions, particularly in A.C. telegraphy facilities, operated through carrier frequency channels.

In order to reduce crosstalk group-frogging is used in intermediate repeater stations for the two-wire separate position carrier frequency systems. For example, in known systems the intelligence channel of the east-west-direction, arriving in the normal frequency position of 6 . . . 54 kc./s. is transferred into the frequency band 60 . . . 108 kc./s. in the inverted position.

For the east-west-direction a corresponding group frogging is made. For this frogging a group carrier of 114 kc./s. is required, the frequency of which should also remain within narrow tolerances of the nominal value for reasons already outlined above.

Therefore, the required carrier wave frequencies in the carrier frequency engineering are generated by highly constant, crystal stabilized generators and/or derived from the frequency of such a generator by multiplying,dividing, and mixing. Since these generators, too, show a certain, even though small frequency deviation in their use course of the time, they too must be adjusted from time to time. It is known to transmit from a terminal station an auxiliary pilot signal or metering frequencies, respectively, either permanently or temporarily together with the intelligence, with the aid of which the different carrier frequency supplies can be adjusted.

As a consequence of the space reduction due to transistorized carrier frequency systems it is intended recently to tele-supply the intermediate repeater stations with energy and to place them subterraneously. Such construction shows the further advantage that considerably less fluctuations occur due to the ambient temperature. For re-adjusting of a group carrier in such a subterraneous intermediate repeater station, the station must be layed bare and open. This is not only time consuming and difficult, but also leads inevitably to changes of the ambient temperature and, consequently, to changes of the frequency of the group carrier. For such intermediate repeater stations an automatic frequency stabilization of the group carrier would be desirable and as a result would considerably simplify maintenance.

For terminal stations, too, an automatic frequency stabilization would be of advantage. Re-adjusting of the frequency of the carriers requires qualified and experienced personnel. Even in such a case adjusting errors cannot completely be excluded. Particularly for the operation of carrier frequency routes in the lower levels the problem of experienced personnel plays a considerable part.

It is the object of the invention to avoid the aforementioned disadvantages of the frequency adjusting of the carriers and to provide for an automatic frequency stabilization of the carriers in carrier frequency systems with suppressed carrier waves.

This is achieved according to the invention that in one of the terminal stations (either west or east) a pilot frequency is added in the group starting position to the emitted group band, that furthermore in the repeater stations (R. St.) the carrier for the group-frogging is derived from the received pilot frequency or a corresponding intrinsic carrier generator is synchronized or re-adjusted, respectively, that furthermore at the other terminal station( east or west respectively) from the pilot frequently, received from the repeater stations (R. St.), the required carrier frequencies are derived either directly or in intrinsic carrier frequency generator is synchronized or re-adjusted, respectively.

Figure 2A:
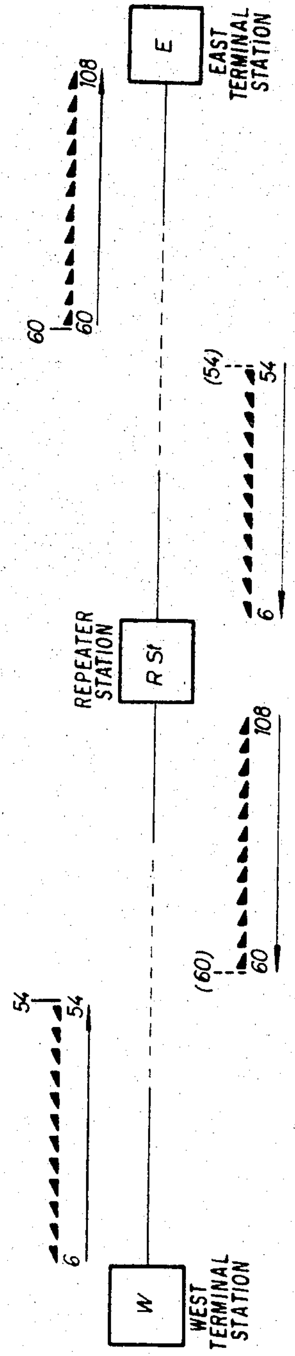
Figure 2D:
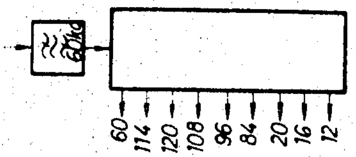
Figure 2C:
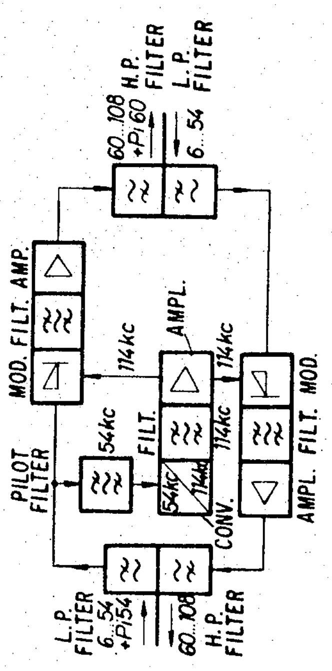
Figure 2B:
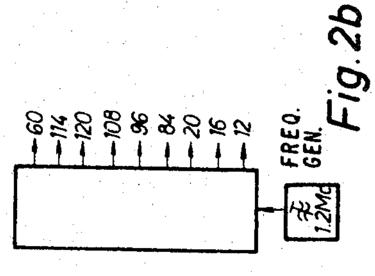
Figure 3:
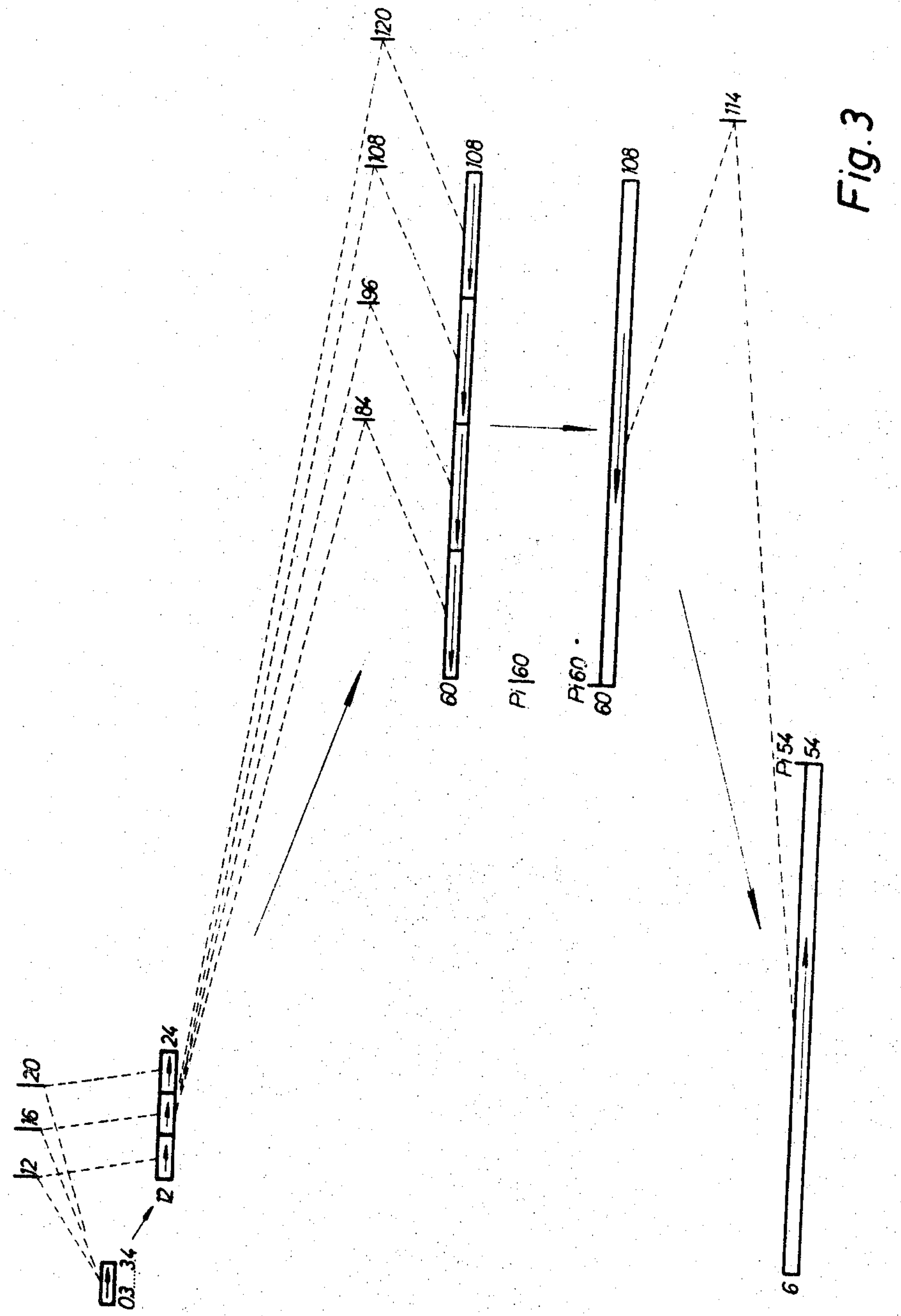
Figure 4:
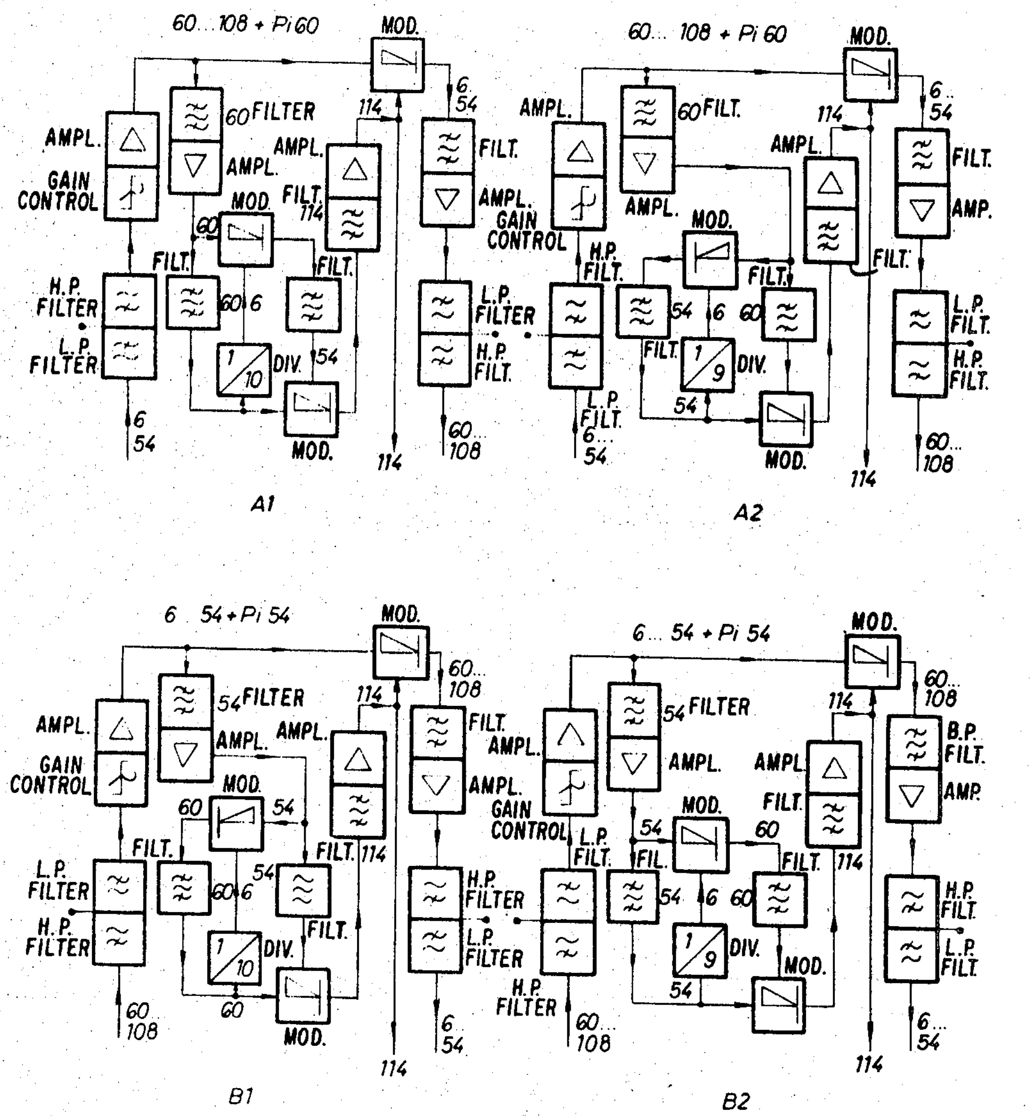
Figure 5A:
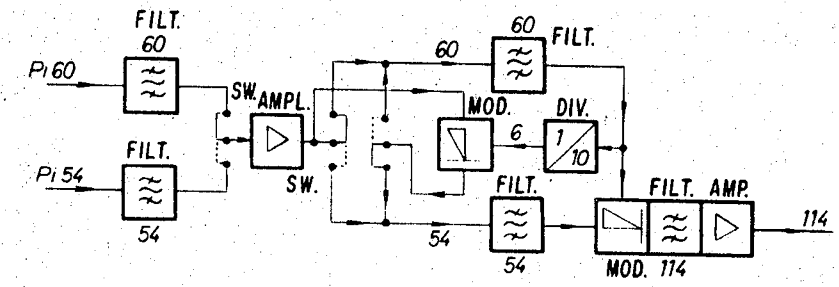
Figure 5B:
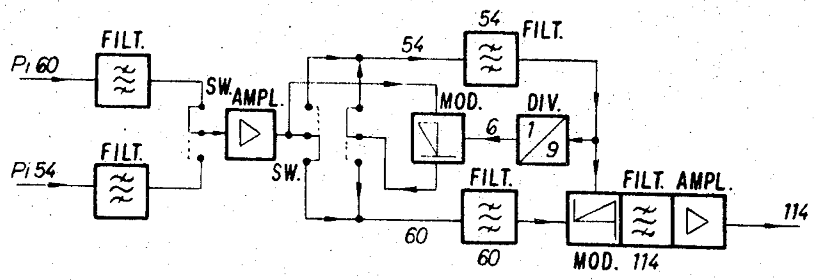

The invention will be described in detail with an example for a two-wire separate position carrier frequency system of the type Z12 with the aid of the accompanying drawings, wherein:

FIG. 1*a–d* shows such a carrier frequency system according to the already outlined disclosed prior art, FIG. 2*a–d* shows the design of the carrier frequency system according to the invention, FIG. 3 shows a frequency scheme of the transmitting end, FIG. 4 shows circuit diagrams of intermediate repeater stations with group-frogging according to the invention, FIG. 5 shows two examples for the generation of the 114 kc./s. carrier, switchable from 60 to 54 kc./s. for a repeater station, switchable from the A- to the B-type.

FIG. 6 shows the derivation of the required carriers from the auxiliary pilot signals, transmitted together with the intelligence, at the synchronized terminal station.

FIG. 1*a* shows a prior art two-wire separate position carrier frequency system. From a west terminal W a twelve-channel group is transmitted in the east direction in the frequency position 6 . . . 54 kc./s. whereby the channels are in upright or normal position in this group.

Group-frogging is made in the repeater station R. St. and the arriving channel group band of 6 . . . 54 kc./s. is transferred into the frequency position 60 . . . 108 kc./s with inverted position of the channels and transmitted to the east terminal E. The transmission in the east-west-direction from terminal station E to terminal station W is carried out correspondingly. The FIGS. 1*b* and 1*d* show two of the conventional carrier wave generating facilities.

In FIG. 1*b* the required carriers are derived from a highly stabilized 4 kc./s. generator while, according to FIG. 1*d*, a highly stabilized 1.2 mc./s. generator is used. The advantages and disadvantages of both types are sufficiently known. For establishing the group band to be emitted FIG. 3 may serve as an explanation, if in said figure the pilot frequencies 60 and 54 kc./s. are not considered at first. FIG. 1*c* shows a repeater station with group frogging. The group band of 6 . . . 54 kc./s. in upright or normal position, arriving from the west terminal W is transferred with the aid of the carrier 114 kc./s. into the frequency position 60 . . . 108 kc./s. of the inverted position and emitted to the east terminal station. The technique of the group-frogging is so well known that an exact description of FIG. 1*b* is superfluous.

The FIGS. 2*a* to *d* and FIG. 3 show the hitherto described carrier frequency system, applying the teachings of the invention. W represents the west terminal from where all further required carriers are stabilized in their frequency. Besides the conventional carrier frequencies of 12, 16, 20, 84, 96, 108, 120, and 114 kc./s., a pilot frequency of 60 kc./s. is derived from the frequency of the highly stabilized basic generator or for example 1.2 mc./s. as shown in FIG. 2*b*, or 4 kc./s. Said 60 kc./s. pilot is led to the basic group 60 . . . 108 kc./s. as may be gathered from FIG 3. After the basic group has been transferred into the band of 6 . . . 54 kc./s. the pilot signal has the frequency position of 54 kc./s. In the repeater station (FIG. 2*c*) the pilot frequency of 54 kc./s. is filtered out of the arriving group band and from said pilot frequency the required carrier frequency of 114 kc./s. is derived, being necessary for the group-frogging. With the aid of this carrier the group band of 6 . . . 54 kc./s. arriving from the west terminal. W is transferred into the frequency position 60 . . . 108 kc./s., whereby the received pilot frequency of 54 kc./s. receives the frequency of 60 kc./s. due to the group-frogging In the east terminal E the pilot frequency of 60 kc./s. is then filtered out and the required carrier frequencies are derived from it either directly or a basic generator provided in the east terminal is re-adjusted by frequency-comparison with the pilot frequency.

Although for the east-west-direction such a pilot frequency is not required for carrier frequency stabilization its emission can be of advantage for supervising purposes, because in the west terminal W the proper functioning of the carrier frequency stabilization can be checked in a simple manner by comparing the added pilot frequency with the received one. In the example hitherto described the frequencies of 60 and 54 kc./s. have been selected as pilot frequencies for frequency stabilization. These two frequencies show the advantage that they are not simultaneously zero frequencies, that means they are not of the same value with the frequencies of the suppressed channel carrier and can thus not be influenced by probable carrier wave residues.

To this end, however, also the other limit or cut-off frequency pair of 108 and 6 kc./s. can be selected which is, however, zero-frequency at the same time, or other corresponding zero-frequency pairs, e.g. 76 and 38 kc./s., etc. For selecting the pilot frequencies it should also be considered, whether from the selected frequency the required carrier frequency of 114 kc./s. can be derived in the repeater station in a simple manner or, whether with the aid of the received pilot frequency the required carriers can easily be derived in the synchronized terminal station, or whether the existing basic generator can be re-adjusted in a simple way.

FIG. 4 now shows two examples for deriving the 114 kc./s. carrier for the group-frogging in a repeater station out of the pilot frequencies of 60 respectively 54 kc./s. The examples A1 . . . A2 show the derivation of the 114 kc./s. carrier from 60 kc./s. and B1 . . . B2 from 54 kc./s.

It is common to all four examples that the group band to be transferred or frogged is led to a gain control with a following amplifier via a directional filter, consisting of a high-pass and a low-pass filter, the output of the amplifier being connected on one hand with a modulator and on the other hand with a bandpass filter to filter out the pilot frequency From said pilot frequency the carrier frequency of 114 kc./s. is derived in a different way, described later on, which carrier frequency is led to the other input of the modulator after filtering through a bandpass filter and amplification, while from the output of said modulator the inverted group band is obtained via a bandpass filter and said group band is applied to the transmission line via a directional filter, after proper amplification.

In the example A1 the pilot frequency of 60 kc./s. is amplified, after having been filtered out through a bandpass filter, and led to one input of the first modulator, at the other input of which the pilot frequency, divided by the factor or coefficient 10, is applied. At the output of said modulator the difference frequency of 54 kc./s. is obtained through a bandpass filter and led to the input of a second modulator, to the second input of which the pilot frequency of 60 kc./s. is applied, so that at the output of said second modulator the frequency of 114 kc./s. can be derived as cumulative frequency.

Example A2 shows a modification of the arrangement according to A1 in such a way that the frequency of 54 kc./s. is obtained from the frequency of 60 kc./s., according to the principle of re-conversion.

In the carrier frequency engineering it is conventional to provide switching-over between both possible positions of the group frequency band (6 . . . 54 or 60 . . . 108 kc./s., respectvely), arriving at the repeater stations. Therefore the group carrier of 114 kc./s. must be derived from the pilot frequency of 54 or 60 kc./s., respectively in a corresponding way. FIG. 5 now shows such a switch-over type generation of the group carrier of 114 kc./s. Thereby the arrangement A1 of FIG. 4 is transferred into the arrangement B1, respectively the arrangement A2 into the arrangement B2 by switching over, as shown in FIG. 5*a*.

If it is required that the carrier frequency system remains in operation, even after the failure of the pilot frequency it is possible to synchronize a 114 kc./s.-generator in the repeater station with the aid of the frequency, derived from the pilot frequency, which generator freely oscillates, after failure of the pilot frequency.

Figure 6A:
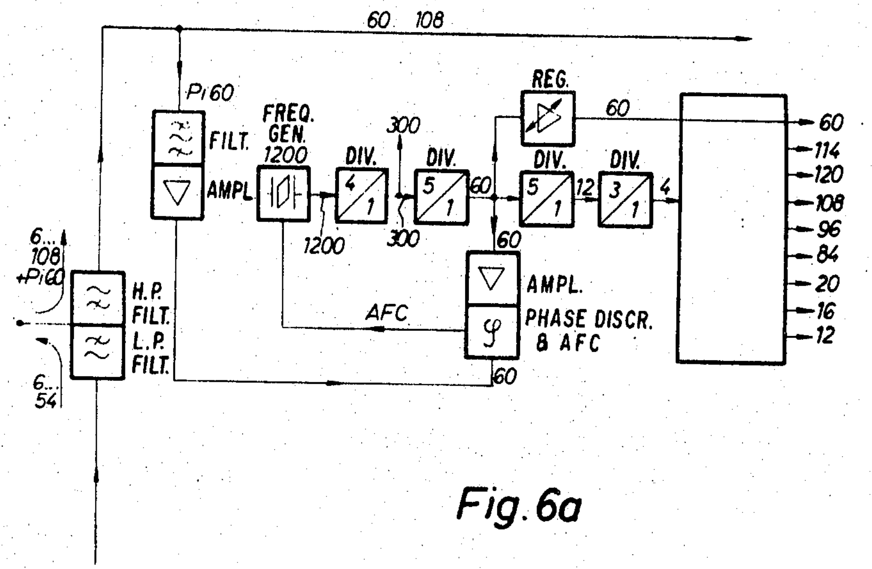
Figure 6B:
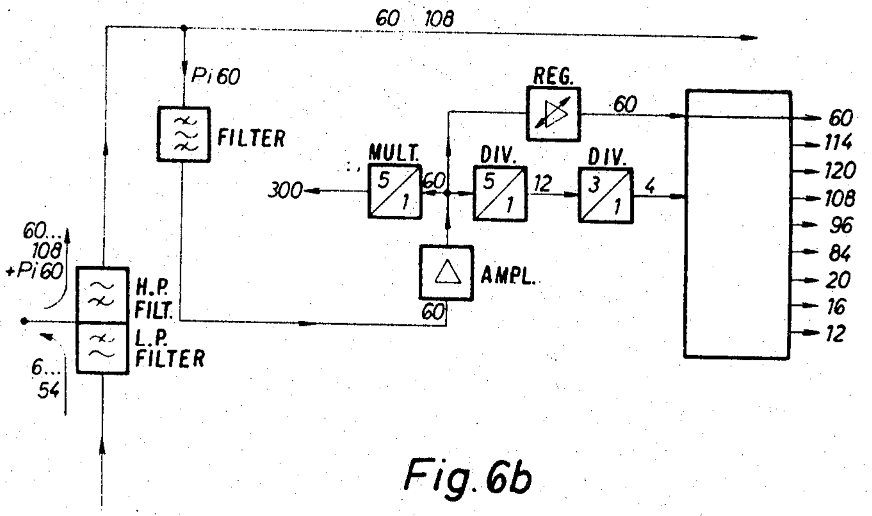

FIG. 6 now shows an example for frequency stabilization of the carrier frequencies in the other (east) terminal station E. FIG. 6*a* shows an automatic re-adjusting of the frequency of a 1.2 mc./s. generator from which thereupon the basic frequency of 4 kc./s. is derived by division, from which frequency thereupon in a way known per se the remaining general-carrier frequencies, pregroup-carrier frequencies, and group carrier fequencies ae generated, while FIG. 6*b* shows the direct derivation of the basic frequency of 4 kc./s., derived from the pilot frequency of 60 kc./s.

While in the latter case from the 60 kc./s. pilot frequency, filtered out of the received group frequency band of 60 . . . 108 kc./s. the basic frequency is directly obtained through division 5:1 and 3:1, the frequency of 1.2 mc./s., produced in a crystal-stabilized generator according to FIG. 6*a*, is divided to 60 kc./s. by means of two divisions 4:1 and 5:1. Said 60 kc./s. are compared in a phase discriminator with the pilot frequency of 60 kc./s., received. Said discriminator furnishes, in case of deviations, an automatic frequency control AFC which is used to re-adjust the 1.2 mc./s. generator. The thus stabilized 60 kc./s. frequency is further processed in compliance with the arrangement shown in FIG. 6*b*.

For which of both arrangements, representing of course only an example of many possible similar divider circuits a decision is made, depends on whether it is required that even at a failure of the 60 kc./s. pilot frequency the carrier supply should go on, or whether it can be desisted from such a carrier frequency supply.

It needs not to be mentioned specifically that, according to the invention, the pilot frequency, serving to stabilize the frequency, can also be used simultaneously for an automatic level control. While the principles of the invention have been described above in connection with specific apparatus and applications, it is to be understood that this description is made only by way of example and not as a limitation on the scope of the invention.

What is claimed is:

1. An arrangement for automatic stabilization on carrier frequency systems using suppressed carrier waves and frequency frogging, said systems including a WEST terminal station,
an EAST terminal station,
repeater station means between said terminal stations,
said terminal stations comprising means for transmitting multi-channeled groups of low frequency signals and receiving multi-channel groups of high frequency signals,
first one-way filter means at said repeater station means for receiving said transmitted low frequency signals from said WEST terminal station and for transmitting high frequency signals to said WEST terminal station,
second one-way filter means at said repeater station means for transmitting said high frequency signals to said EAST terminal station and for receiving the low frequency signals from said EAST terminal station,
said first and second filter means each comprising a low pass filter for passing only said low frequency signals of said multi-channel groups and a high pass filter for passing only said high frequencies of said multi-channel groups,
means at the WEST one of said terminal stations for providing a first pilot signal for transmittal with the said low frequency signals,
converter means in said repeater station means for deriving the group carrier for group frogging only from said first pilot signal,
said converter means comprising variable gain amplifier means controlled by said first pilot signal,
means for filtering out said first pilot signal, means for coupling said filtered first pilot signal to one input of a first modulator,
means for frequency dividing said filtered pilot signal,
means for coupling said first divided pilot signal to a second input of said first modulator,
means for filtering the output of said first modulator to obtain an intermediate frequency signal having a frequency equal to the sum of said first pilot signal and the divided first pilot signal,
means for coupling said intermediate signal to a first input on a second modulator,
means for coupling said filtered first pilot signal to the second input of said second modulator means,
means for filtering out the sum of said first pilot signal and said intermediate signal to serve as said group carrier,
and means in said repeater station means includuing said filter means for shifting the frequency of said first pilot signal to form a second pilot signal,
stabilizing means at the WEST one of said terminal stations for using the second pilot signal in providing the carrier frequency used in transmitting from said EAST terminal station.

References Cited

UNITED STATES PATENTS

| | | | |
|---|---|---|---|
| 2,695,927 | 11/1954 | Caruthers et al. | 179—15 |
| 2,871,294 | 1/1959 | Stachiewicz | 325—49 |
| 3,176,226 | 3/1965 | Berger | 325—49 |
| 3,182,131 | 5/1965 | Barnes | 179—15 |
| 3,308,379 | 3/1967 | Leuseiffer et al. | 325—421 X |

ROBERT L. GRIFFIN, *Primary Examiner.*

BENEDICT V. SAFOUREK, *Assistant Examiner.*

U.S. Cl. X.R.

325—9, 49, 63